Patented May 28, 1935

2,002,634

UNITED STATES PATENT OFFICE 2,002,634

VULCANIZED ASPHALT OIL AND PRODUCT CONTAINING IT

Harold S. Holt, Wilmington, Del., assignor to E. I. du Pont de Nemours & Company, Wilmington, Del., a corporation of Delaware No Drawing. Application March 7, 1930, Serial No. 434,162

15 Claims. (Cl. 134—51)

This invention relates to the art of coated fabrics and, more particularly, to protective coatings for rubber coated fabrics.

In an application filed on December 31, 1927, by Gocher and Parrett, Serial No. 244,041, which issued October 17, 1933, as U. S. Patent No. 1,931,110, there is described the production of such coatings, including a hydrocarbon oil termed "asphalt oil". This material is prepared by the destructive distillation of bituminous materials and is fluid in nature, its fluidity or viscosity depending on various factors, including the type of material from which it is made. Since it is often low in viscosity when supplied to the trade, and in such a condition is undesirable for use in finishing rubber coated fabrics, owing to the fact that low viscosity coatings tend to flow too freely and result in a finish of poor covering power and uneven appearance, it is necessary to increase its viscosity.

To accomplish this, Gocher and Parrett heat the oil in an open container to remove the more volatile constituents but, inasmuch as this requires the removal of an excessive amount of volatile matter, sometimes as high as 45% of the total, to secure a suitable viscosity, such a process is not economical.

I have discovered that the desired viscosity can be secured without an excessive loss in weight by adding a small amount of sulfur to the oil before it is heated.

It is therefore an object of this invention to provide a new method of rendering asphalt oil suitable for use in rubber coated fabrics.

It is another object of this invention to provide a vulcanized asphalt oil.

It is a further object of this invention to provide coating compositions containing vulcanized asphalt oil.

It is a still further object of this invention to provide rubber coated fabrics with a final baked coat of vulcanized asphalt oil composition.

It is a special object of this invention to produce colored coating compositions containing sulfur treated asphalt oil, and colored rubber coated fabrics provided with a baked coating of such a composition.

With the above and other objects in view, which will be apparent as the description proceeds, I have set forth my invention in the following specification and have included the following examples by way of illustration and not as a limitation:

Example 1

920 parts by weight of asphalt oil (obtained by distilling straight run Mexican flux), having an initial viscosity of 30, measured as indicated below, and 9.3 parts by weight of sulfur, are heated in an open container until the resulting product is reduced to 720 parts by weight, that is a 22.7% loss in weight. The resulting viscosity is 80. When a similar quantity of a similar asphalt oil is heated without sulfur until it represents 728 parts by weight, that is a 20.8% loss in weight, the viscosity is 59.

Example 2

920 parts by weight of asphalt oil like that used in Example 1, and having an initial viscosity of 30, is heated in a similar manner with 28.5 parts by weight of sulfur until the resulting product is reduced to 720 parts by weight, that is a 24.8% loss in weight. The resulting viscosity is 126.

The viscosity of the asphalt oil, as expressed herein, was determined by the time expressed in seconds which is required for 100 cc. to extrude through an orifice .1" in diameter in the bottom of a cup which consisted in a cylindrical upper member 3⅜" in height and 2" in diameter communicating at its base with a cone which tapers from 2" in diameter at its top to the .1" diameter of the orifice, referred to above, the height of said cone being ⅞", and the cup being entirely filled with the material to be tested at the start of the test period. It is understood that the viscosity as expressed in the claims is determined in this manner.

From the above examples it will be apparent that by heating the oil with sulfur the oil may be bodied to a much greater viscosity with practically the same percentage loss in weight or, its obvious equivalent, to a similar viscosity with a smaller percentage loss in weight.

While I prefer to add 2 to 3% of sulfur, based on the weight of the oil, I do not wish to be limited to these proportions of sulfur.

The advantage described herein appears to be due to a polymerizing action in which hydrogen is removed from the asphalt oil and, in combination with the sulfur, escapes as hydrogen sulfide, although I do not wish to be limited to this theory of operation.

Although vulcanized or sulfur treated asphalt oils, prepared as indicated herein, may be used in various ways, I have found them particularly useful in coating compositions such as the following:

*Example 3*

| | Parts by weight |
|---|---|
| Pigment | 27 |
| Vulcanized asphalt oil | 85 |
| Drying oil | 8 |
| Petroleum asphalt | 12 |
| Gasoline | 8 |
| Total | 248 |

*Example 4*

| | Parts by weight |
|---|---|
| Pigment | 50 |
| Vulcanized asphalt oil | 100 |
| Petroleum asphalt | 16 |
| Thinner | 12 |
| Total | 178 |

Coating compositions falling within the scope of the present invention are prepared by grinding or dispersing the pigment with any desired portion of the vehicle sufficient to provide a consistency suited to the dispersing device used. After dispersion the remainder of the composition is added.

The pigments may be of various types, including chrome green, chrome yellow, carbon black, bone black, and iron oxide.

The thinner may be gasoline, xylol, toluol or other hydrocarbon solvent.

The drying oil may be of any desired type, such as China wood oil, linseed oil or perilla oil.

Although petroleum asphalt is preferred, this may be replaced, with somewhat less satisfactory results, by other bituminous material, such as gilsonite, stearin pitch, natural oil asphalt or other bitumens.

Varnishes, such as the above, containing my improved asphalt oil may be applied to any flexible fabric coated with a rubber compound in the usual manner, and the resulting fabric may be dried in any suitable way, as by festooning it in a chamber and heating for 2½ hours at 250° F.

The resulting varnish films are non-brittle and remain so after prolonged exposure to atmospheric influences.

Coating compositions containing my improved vulcanized asphalt oil may be varied within the following limits:

Vulcanized asphalt oil 40 to 85%,
Pigment 10 to 40%,
Combinations of bituminous material and drying oil (in any desired ratio) 5 to 30%.

It will therefore be apparent that I have developed a new and useful vulcanized asphalt oil and a method of producing it, and that I have also developed new and useful coating compositions which have improved resistance to sunlight and weather, and that such compositions may be produced in various colors and used for various purposes, such as automobile top material, upholstery, and waterproof apparel, such as raincoats.

By the term "asphalt oil", as used herein and in the claims, I mean an oily distillate obtained by the destructive distillation of asphalt, or stearin pitch, said product being liquid at ordinary temperature and being capable of partial polymerization to an asphalt on heating, having a Baumé reading of less than 40 before being bodied by heat treatment, and having film forming properties. By the term "asphalt" I mean natural asphalts or asphalts derived from petroleum oils.

As many apparently widely different embodiments of this invention may be made without departing from the spirit and scope thereof, it is to be understood that I do not limit myself to the specific embodiments thereof except as defined in the appended patent claims.

I claim:

1. A coating composition comprising a pigment, a bituminous material and the reaction product obtained by heating a mixture consisting of asphalt oil and sulfur until the viscosity is increased to at least eighty.

2. A coating composition comprising a pigment, a bituminous material, a drying oil, and the reaction product obtained by heating a mixture consisting of asphalt oil and sulfur until the viscosity is increased to at least eighty.

3. A coating composition comprising the reaction product obtained by heating a mixture consisting of asphalt oil and sulfur, the sulfur being in an amount which is 1% to 3% by weight of the asphalt oil until the viscosity is increased to at least eighty.

4. A coating composition comprising the reaction product obtained by heating a mixture consisting of asphalt oil and sulfur, the sulfur being in an amount which is 1% to 3% by weight of the asphalt oil, until the mixture loses approximately 22% to 25% of its weight.

5. A coating composition comprising a colored pigment, a petroleum asphalt, a drying oil, and the reaction product obtained by heating a mixture consisting of asphalt oil and sulfur until the viscosity is increased to at least eighty.

6. The process of making a coating composition which comprises heating a mixture consisting of asphalt oil and sulfur until the viscosity is increased to at least eighty and combining the reaction product with a pigment and a bituminous material.

7. The processs of making a coating composition which comprises heating a mixture consisting of asphalt oil and sulfur until the viscosity is increased to at least eighty, the sulfur being in an amount which is 1 to 3% by weight of the asphalt oil and combining this product with a pigment and a bituminous material.

8. The process of making a coating composition which comprises heating a mixture consisting of asphalt oil and sulfur until the asphalt oil loses approximately 22 to 25% of its weight and combining this product with a pigment and a bituminous material.

9. The process of making a coating composition which comprises heating a mixture consisting of asphalt oil and sulfur until the viscosity is increased to at least eighty and combining this product with a pigment, a bituminous material and a drying oil.

10. The process of making a coating composition which comprises heating a mixture consisting of asphalt oil and sulfur until the viscosity is increased to at least eighty, the sulfur being in an amount which is 1 to 3% by weight of the asphalt oil and combining the reaction product with a pigment, a bituminous material and a drying oil.

11. The process of making a coating composition which comprises heating a mixture consisting of asphalt oil and sulfur until the asphalt oil loses approximately 22 to 25% of its weight and combining this product with a pigment, a bituminous material and a drying oil.

12. The process of making a coating composition which comprises heating a mixture consisting of asphalt oil and sulfur until the asphalt oil loses approximately 22 to 25% of its weight and combining this product with a pigment and a petroleum asphalt.

13. A coating composition comprising 10 to 40 parts by weight of pigment, 5 to 30 parts by weight of bituminous material and drying oil, and 40 to 80 parts by weight of the product obtained by heating a mixture consisting of asphalt oil and sulfur until the viscosity is increased to at least eighty.

14. A process of producing a coating composition which comprises heating a mixture of asphalt oil and sulfur, the sulfur being in an amount which is 1% to 3% by weight of the asphalt oil, until the mixture loses approximately 22% to 25% of its weight, and combining this product with coating composition ingredients.

15. A process of producing a coating composition which comprises heating a mixture of about 920 parts by weight of asphalt oil and about 28.5 parts by weight of sulfur in an open container until the resulting product is reduced to about 720 parts by weight, and combining this reaction product with a pigment, a drying oil, a bituminous material, and a thinner.

HAROLD S. HOLT.